(12) United States Patent
Boland et al.

(10) Patent No.: US 7,937,297 B2
(45) Date of Patent: *May 3, 2011

(54) RFID SYSTEM USING SOA

(75) Inventors: Wayne Boland, Aurora, CO (US);
Puneet Agarwal, Palo Alto, CA (US);
Ashok Banerjee, Fremont, CA (US)

(73) Assignee: BEA Systems, Inc., Redwood Shores, CA (US)

( * ) Notice: Subject to any disclaimer, the term of this patent is extended or adjusted under 35 U.S.C. 154(b) by 857 days.

This patent is subject to a terminal disclaimer.

(21) Appl. No.: 11/397,210

(22) Filed: Apr. 4, 2006

(65) Prior Publication Data

US 2007/0069855 A1    Mar. 29, 2007

Related U.S. Application Data

(60) Provisional application No. 60/720,980, filed on Sep. 27, 2005.

(51) Int. Cl.
*G06Q 10/00* (2006.01)
*G06F 17/60* (2006.01)

(52) U.S. Cl. ............................................. 705/28; 705/3

(58) Field of Classification Search ............... 705/26–28
See application file for complete search history.

(56) References Cited

U.S. PATENT DOCUMENTS

| | | | |
|---|---|---|---|
| 2005/0108057 A1* | 5/2005 | Cohen et al. | 705/3 |
| 2005/0252971 A1* | 11/2005 | Howarth et al. | 235/451 |
| 2006/0209868 A1* | 9/2006 | Callaghan | 370/428 |
| 2007/0027966 A1 | 2/2007 | Singhal et al. | |
| 2007/0050305 A1* | 3/2007 | Klein | 705/67 |

OTHER PUBLICATIONS

SeeBeyond to Showcase RFID Solution in Conjunction with Sun Microsystems at 3rd Annual RFID World Conference Business Wire. New York: Mar 2, 2005. p. 1.*
International Search Report for PCT/US06/12689 dated Sep. 25, 2007, 6 pages.

* cited by examiner

*Primary Examiner* — Matthew S Gart
*Assistant Examiner* — Garcia Ade
(74) *Attorney, Agent, or Firm* — Fliesler Meyer LLP

(57) ABSTRACT

An RFID edge server can associate with multiple RFID readers at a location, a service bus can receive RFID data from the RFID edge server and make the RFID data available to multiple services that consume the RFID data.

19 Claims, 11 Drawing Sheets

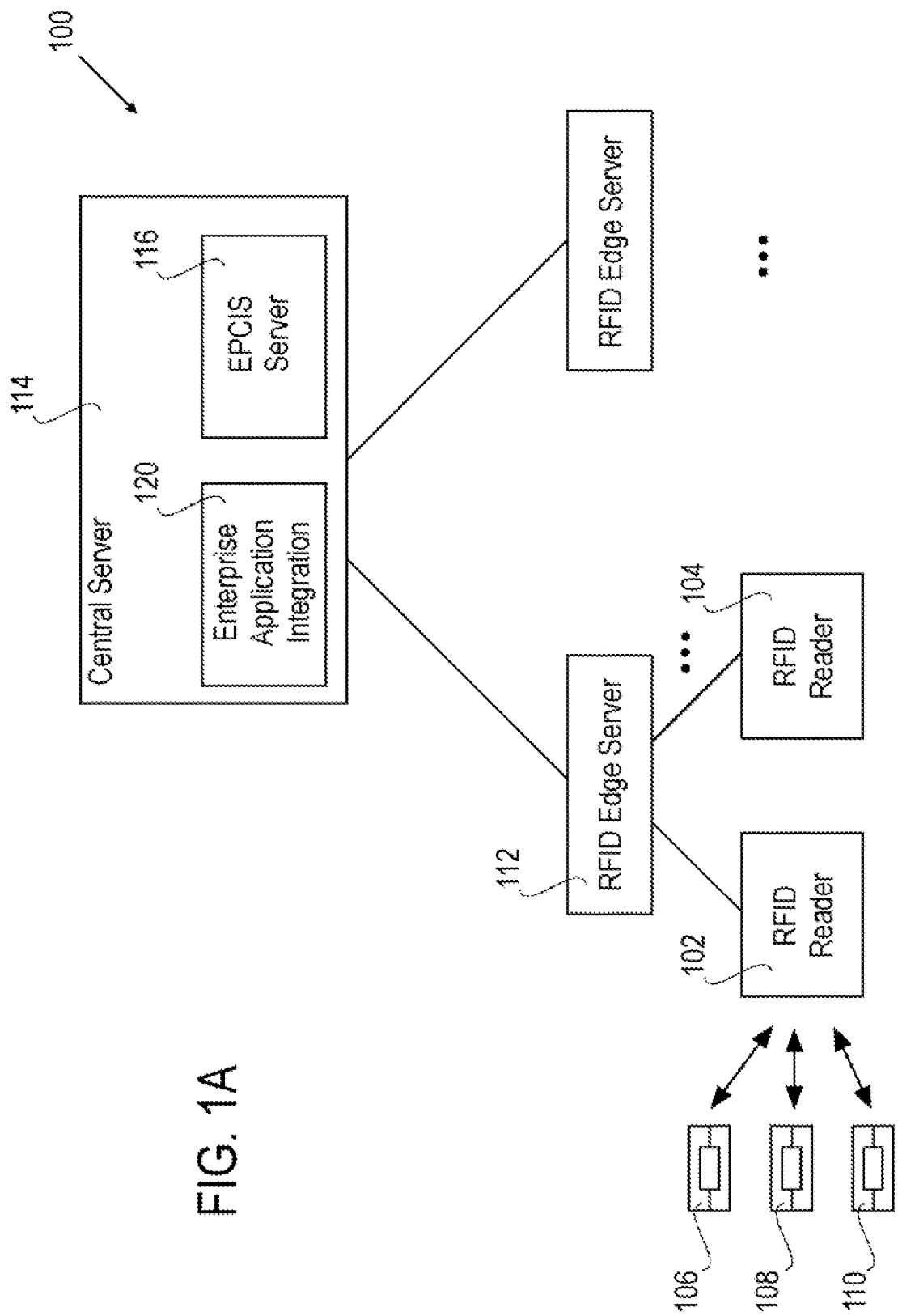

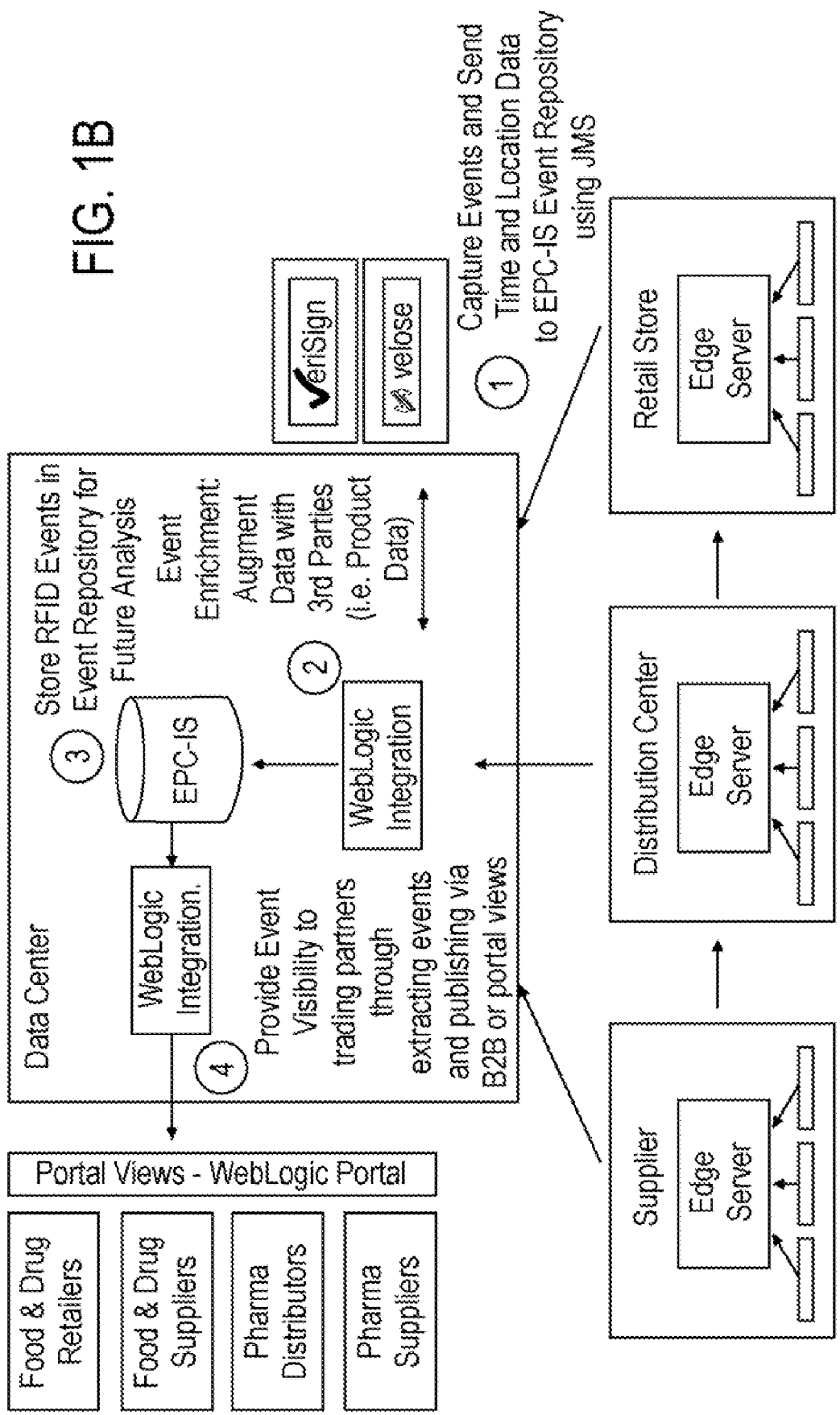

RFID SYSTEM USING SOA

CLAIM OF PRIORITY

This application claims priority to, and hereby incorporates by reference, U.S. Provisional Application No. 60/720,980 entitled "RFID System Using SOA" filed Sep. 27, 2005.

CROSS-REFERENCES TO RELATED APPLICATIONS

This application incorporates by reference U.S. patent application Ser. No. 11/221,261 entitled "Dynamically Configurable Service Oriented Architecture" filed Sep. 7, 2005; and U.S. Provisional Application No. 60/721,023 entitled "RFID Edge Server with Security Plug-Ins and WSRM" filed May 27, 2005.

BACKGROUND OF INVENTION

The present invention relates to Radio Frequency Identification (RFID) technology. Radio Frequency Identification technology is becoming more and more important, especially to manage supply chains.

Radio Frequency Identification technology can allow for the tracking of objects using RFID tags and RFID readers. RFID readers can interrogate the RFID tags using radio waves. The RFID tag typically includes an antenna and a microchip that stores a response code. The majority of RFID tags use a silicon microchip to store a unique serial number, such as an electronic product code (EPC), and usually some additional information. The reader can pass the response code to a computer system to track the objects.

There are two main categories of RFID systems, passive and active systems. Passive RFID tags do not have a transmitter but simply reflect back energy to the reader. Active tags have their own transmitter and power source, such as a battery. Active RFID systems are typically used for tracking large items since the active RFID tags are relatively expensive.

Because passive RFID tags do not use a power source and transmitter, they tend to be cheaper than the active RFID tags. Retailers and manufacturers are adding the passive tags to items in the supply chain. RFID systems can significantly reduce the cost of managing inventory.

Passive RFID tags allow for the possibility of tracking of cartons of materials as they enter and exit entry points of a warehouses and stores. As the passive RFID tags become cheaper, ultimately individual packages can have their own RFID tags and thus the inventory can be tracked very precisely. Additionally, since the RFID technology does not rely on line-of-sight operation, a shopping cart full of goods with RFID tags can be scanned without requiring the goods to be removed from the cart.

In one embodiment, RFID tags can be used to implement an electronic product code (EPC). The EPC is a unique number used to identify specific objects in the supply chain. EPC information services (EPCIS) can enable users to exchange EPC related data with trading partners throughout the EPC network.

BRIEF DESCRIPTION OF THE DRAWINGS

FIG. 1A is a diagram of an RFID system of one embodiment.
FIG. 1B is a diagram of an exemplary RFID system.

DETAILED DESCRIPTION

Figure 2:
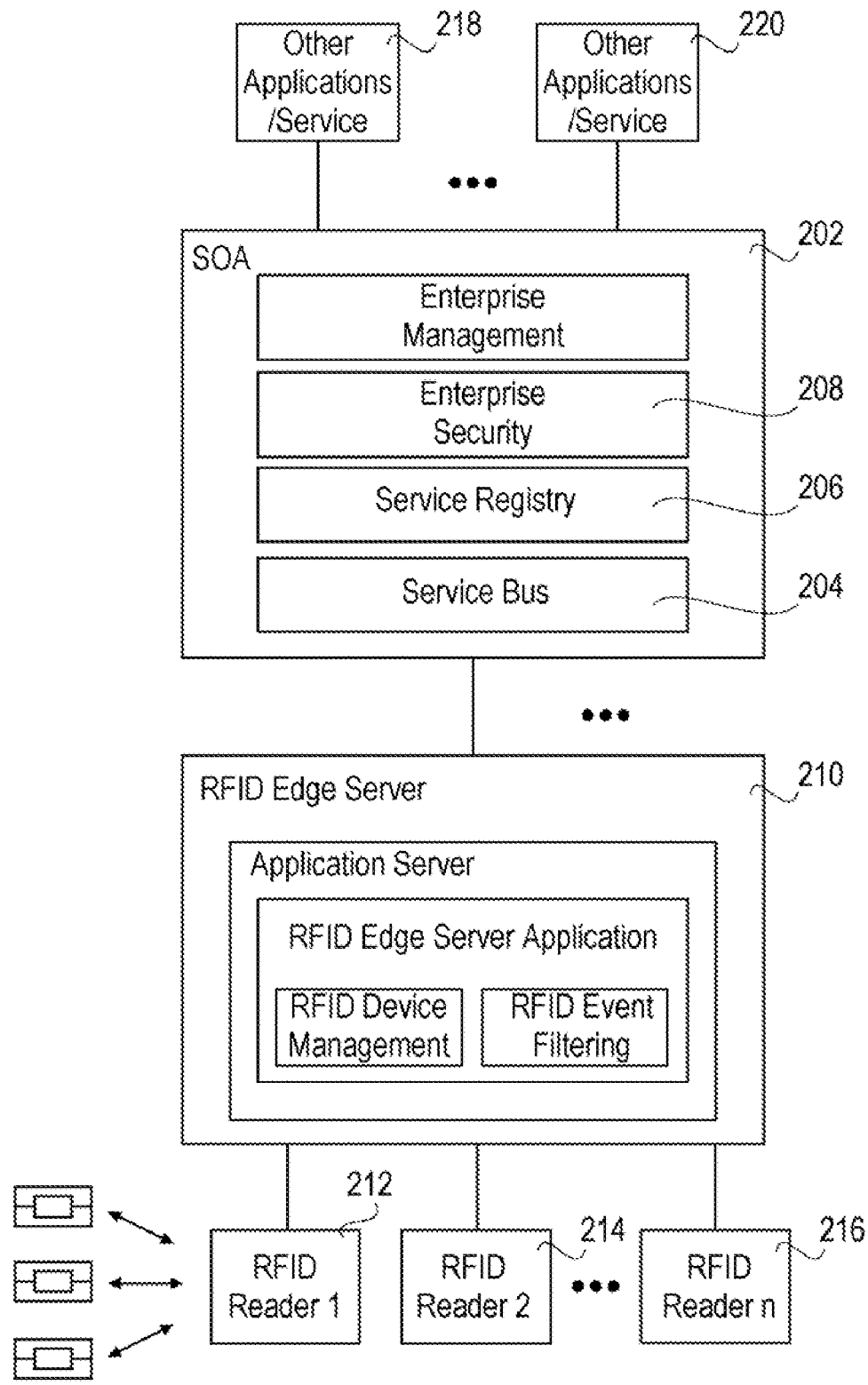
FIG. 2 is a diagram of an RFID system using SOA

FIG. 1A illustrates a RFID system 100. RFID readers 102 and 104 can be used to interrogate RFID tags 106, 108 and 110. Data from the RFID tags, such as EPC codes, can be read by the RFID reader and provided to an RFID edge server 112. Typically, the RFID readers 102 and 104 are constantly interrogating for responses from the RFID tags 106, 108 and 110. The RFID edge server 112 can thus receive a large number of duplicative responses. RFID edge server 112 can send event reports to the central server 114. The central server 114 can include a EPCIS server 116 and enterprise application integration software 120.

The RFID edge server can be used to provide RFID reader management, filtering, commissioning, and connectivity. In one embodiment the RFID edge server 102 can include an application server, such as a J2EE application server. J2EE applications servers can run J2EE applications.

FIG. 1B illustrates the use of an RFID system to 1) capture RFID events, 2) enrich RFID events with product data, 3) store RFID events in an event repository, and 4) provide event visibility to trading partners.

In one embodiment, the RFID system uses a Service-Oriented Architecture (SOA). Service-Oriented Architecture is an IT strategy that organizes the discrete functions contained in enterprise applications into interoperable, standards-based services that can be combined and reused quickly to meet business needs.

SOA can allow for the automation of process data using RFID. The RFID event data can be filtered in the RFID edge server then sent to the service bus. RFID data can include the EPC, location and time data. The RFID data can be used in services available on the service bus. These and other services can be used in composite applications that use the RFID data and can use non-RFID data, such as warehouse data.

A number of different services and composite applications using the RFID data can be done. A service could be used to measure promotion compliance, for example. How long does a product stay on the shelf. Dwell times can also be tested. How long does a product stay in the backroom. RFID data can be used to keep track of stock, for example in a just-in-time inventory system. RFID data can be used to keep track of perishable goods, do promotion on the fly, change prices of the fly and the like.

By organizing enterprise IT around services instead of around applications, SOA can provide key benefits:
Improves productivity, agility and speed for both Business and IT
Allows IT to deliver services faster and align closer with business
Allows the business to respond quicker and deliver optimal user experience
Masks the underlying technical complexity of the IT environment
This can result in more rapid development and more reliable delivery of new and enhanced business services.

SOA is valuable to enterprises that need to solve business-critical problems using information technology, including enterprises that want to minimize redundant infrastructure and create a common business interface across customer and employee systems; businesses that need to personalize information to users based on roles and workflows, and organizations that want to use the Internet to boost revenue per customer through cross-selling, up-selling and access via mobile devices.

Enterprises that adopt a service-driven approach can experience the following business and IT benefits:

Business Benefits of Service-Oriented Architecture

Efficiency: Transform business processes from siloed, replicated processes into highly leveraged, shared services that cost less to maintain.

Responsiveness: Rapid adaptation and delivery of key business services to meet market demands for increased service levels to customers, employees, and partners.

Adaptability: More effectively rollout changes throughout the business with minimal complexity and effort, saving time and money.

IT Benefits of Service-Oriented Architecture:

Reduced Complexity: Standards-based compatibility versus point-to-point integration reduces complexity Increased Reuse: More efficient application/project development and delivery through the reuse of shared services, previously developed and deployed Legacy Integration: Legacy applications, leveraged as re-usable services, lowers the cost of maintenance and integration In one embodiment, a layered RFID SOA approach can be used. The RFID applications can be loosely coupled though a service bus. Centralized management can be used for configuration, security and management of the RFID edge servers. The service bus can allow for high monitoring visibility.

FIG. 2 shows exemplary SOA software 202.

One embodiment of the present invention is a system comprising an RFID edge server 210 to associate with multiple RFID readers 212, 214, and 216 at a location. A service bus 204 can receive RFID data from the RFID edge server 210 and make the RFID data available to multiple services 218 and 220 that consume the RFID data.

One embodiment of the present invention is a system comprising a service bus 204 to receive RFID data and non-RFID data and to make the RFID data and non-RFID data available to multiple services that consume the RFID data and non-RFID data; and a service registry 206 to make the multiple services 218 and 220 available to applications.

One embodiment of the present invention is a system comprising a service bus 204 to make RFID data available to multiple services 218 and 220; and at least one composite application that uses at least one of the multiple services and at least one other service.

A service bus can be any component that makes services available to applications. A service registry can be any component that can be used to find services.

The SOA software 202 can include a service bus 204. The service bus 204 can be a message-based distributed solution that can provide routing, invocation, and mediation services to facilitate the interaction of disparate detracted information technology resourses.

Open Standards. The service bus can provide for open standards in both the service bus solution components (runtime container, messaging infrastructure, integration services, design-time notations) and the mechanisms for integrated resources to participate (attach, request, respond) on the bus.

Message-Based. The communication mechanism of a service bus can be message-based, using standard message notation, protocols, and transports.

Distributed. The service bus runtime environment can be distributed across a networked environment for the purposes of quality of service, quality of protection, and economics.

Routing, Invocation, and Mediation. Routing, invocation, and mediation can be the basic functions of the service bus. Routing can includes addressability and content-based routing. Invocation refers to the ability to make requests and receive responses from integration services and integrated resources. Mediation refers to all translations and transformations between disparate resources including security, protocol, message notation/format and message payload.

Facilitate. The service bus can coordinate the interactions of the various resources and provide transactional support.

Reliable. The service bus can guarantee message delivery.

The service repository 206 can allow applications to find services data and events of the service bus 204. Enterprise security 208 can also be a part of the SOA software 202 protecting the access to services using rules and policies.

The service bus 204 can provide configuration-driven intelligent routing. The message routing can be done according to XQuery-based policies or call-outs to external Web Services to support complex routing steps. The service bus can allow both point-to-point and one-to-many routing scenarios to support both request-response and publish-subscribe models.

Heterogeneous transports between service end-points can be supported by the service bus. Support for the following routing transport protocols: File, FTP, HTTP(s), multiple JMS providers, WS-Reliable Messaging and e-Mail (POP/SMTP/IMAP).

Intelligent messaging brokering between heterogeneous environments can be supported by the service bus. Support can be provided for multiple messaging models including Synchronous, Asynchronous, Publish and Subscribe.

Synchronous to asynchronous bridging can be supported by the service bus. Multiple message formats including SOAP, SOAP with attachments, XML, structured non-XML data, raw data, text, and e-mail with attachments can be used.

Dynamic message transformation can be supported by the service bus. The dynamic service selection can be based on message content or headers and can transform messages based on the target service. In on embodiment, message transformations can be based on XQuery or XSLT. In one embodiment, multiple formats, such as XML and structured non-XML data can be used.

Message enrichment can be supported by the service bus. The service bus can support call-outs to Web Services to gather additional data for transformations.

Infrastructure health and availability monitoring can be supported by the service bus. The service bus can support service monitoring, logging, and auditing with search capabilities. Capture of key statistics for message and transport attributes including message invocations, errors, performance, volume and Service Level Agreement (SLA) violations. Statistics can be gathered locally and aggregated centrally for cluster-wide views with minimal performance impact.

Flexible, graphical management dashboard can be supported by the service bus. The dashboard can provide a cluster-wide view of service status and statistics as well as SLA violations. Console data can be configured to display based on user-defined time intervals.

A service registry 206 can be used. The service registry can provide for service publishing and re-use. The service registry 206 can provide storage of service information about schemas, transformations, WSDLs (Web Service Definition Languages), and policies.

The service registry 206 can provide centralized management and distributed access. Browsing of the service registry can be supported. The service registry 206 can support importing resources from other resources. In one embodiment, the service registry can:

Simplified service provisioning.
Deployment of new versions of services dynamically through configuration.
Migration of configured services and resources between design, staging, and production.
Multiple versions of message resources can be incrementally deployed with selective service access via flexible routing configuration.
Configurable policy-driven security.
Supports WS-Security based authentication, encryption-decryption, and digital signatures.
Uses SSL support for HTTP and JMS transports.
Flexibly supports multiple authentication models.
Rules-driven SLA enforcement.
SLAs can be established on a variety of attributes including throughput times, processing volumes, success/failure ratios of messages processed, number of errors, security violations, and schema validation issues
Alerts can be initiated on automated or operator-initiated responses to rule violations via flexible mechanisms including e-mail notifications, triggered JMS messages, triggered BEA WebLogic Integration™ processes with a JMS message, Web service invocations with a JMS message, or Admin console alerts The Service Registry 206 can be an implementation of UDDI (Universal Description, Discovery and Integration) The service registry can be a mechanism for publishing and discovering Web services and related SOA resources such as WSDL, XML Schemas, and XSLT. The Service Registry can support the business services lifecycle with a configurable Business Service Console. Services can be enabled using mappings of SOA resources, and can be published using wizards. Design efforts and runtime discovery can be facilitated by a secure interface to browse service information, change notification, and standard UDDI data access.

Service management features can include replication, the mapping of Quality of Service (QoS) information, and advanced business service classification. For SOA governance, Service Registry can provide core and lifecycle services, including the industry's strongest support for security and approval processes. The console can also have advanced functionality for security, scalability, and reliability.

The service registry can store registrations in a database or other memory. The service registry security can allow granular access control for registered components. A component publisher can specify find, get, modify and delete access permissions for every published object.

Data Accuracy & Quality enforcement mechanisms can ensure that component registrations are accurate and up-to-date. The Service Registry can define responsibility for the registered components. The Service Registry can offer component promotion and approval mechanisms for promoting components between development, QA and production environments.

Subscription & Notification services can automatically alert registry users about changes to components. Selective Replication among multiple registries can allow for automated propagation between different registries (for example, between internal and external registries). Advanced Taxonomy Management can enforce well-defined taxonomies. The service registry can provide for granular control, logging and auditing of the publishing and discovery processes. Performance & Scalability can be achieved with an efficient Web services stack and database algorithms, and support for a load balancing and clustering mechanism.

Service Registry is a platform-independent solution that is easily deployed in a wide variety of settings. It can run either standalone or within an application server: Many application servers can be supported.

Figure 3:
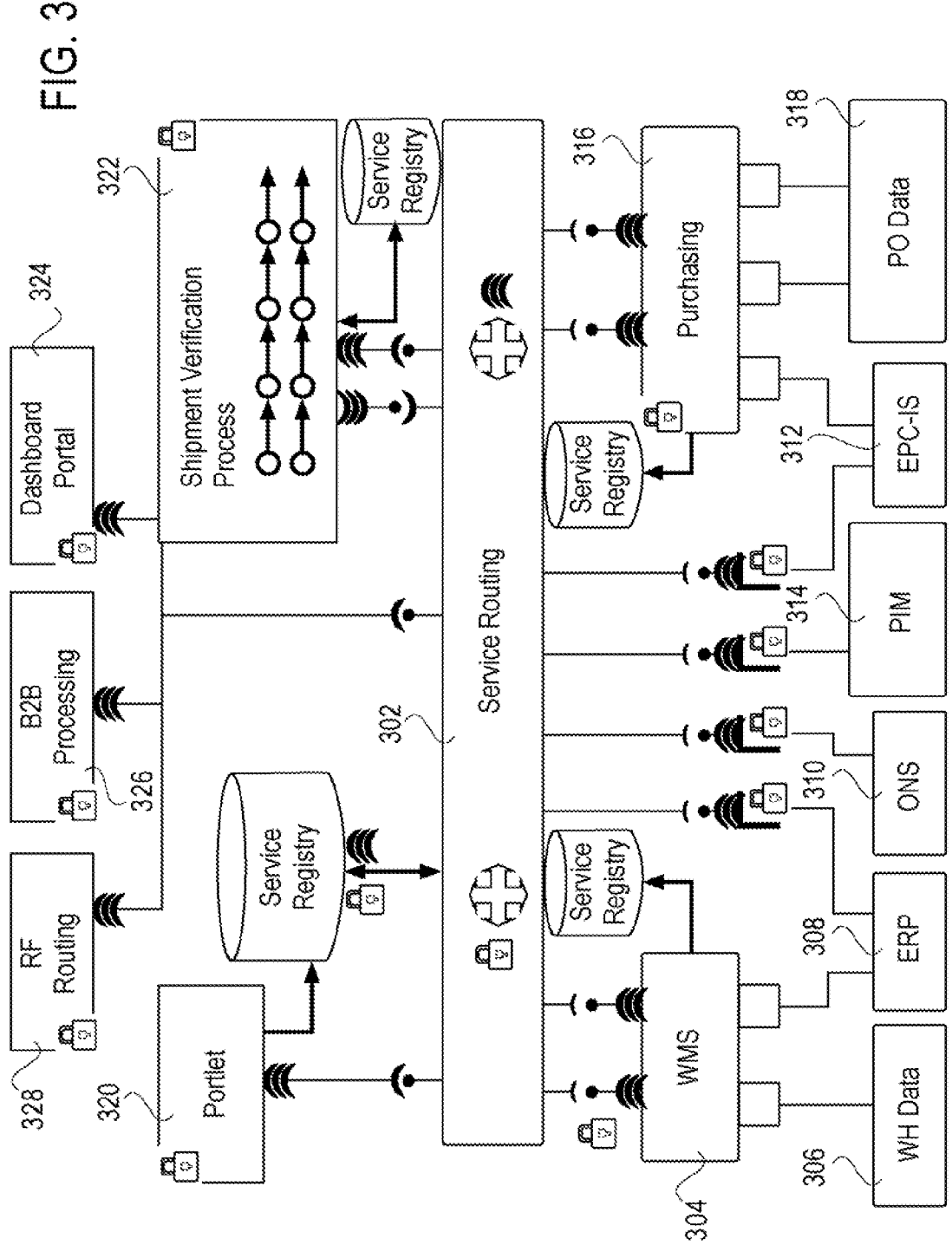
FIG. 3 is a diagram of an exemplary RFID architecture

FIG. 3 shows the use of SOA software for RFID data in one embodiment. Different applications can make use of services made available by the service 302. The applications can include Warehouse Management Software (WMS) 304 that can be associated with Warehouse data 306. The WMS 304 can be also associated with Enterprise Resource Planning (ERP) software 308.

The Object Naming Service (ONS) software 310, Electronic Product Information Code (EPC-IS) 312 and Product Information Management (PIM) 314 can also connect to the service bus 302. These elements allow look up using the EPC codes used with RFID. systems Purchasing software 316 can also connect to the service bus 302 and use purchase order data 318.

RFID edge services alone or through other applications (not shown) can also be connected to the service bus 302.

Applications such as portlets 320, shipment verification software 322, dashboard portal 324, B2B connections 326, and RF routing 328 can also connect to the service bus 302.

The lock symbols in FIG. 3 indicate enterprise security that can be part of SOA. Enterprise management is shown by a triple curve symbol.

SOA can provide for reuse of the services, such as RFID services in different applications. It can provide for standard interfaces that allow applications from different systems, such as different application server to interact.

Figure 4:
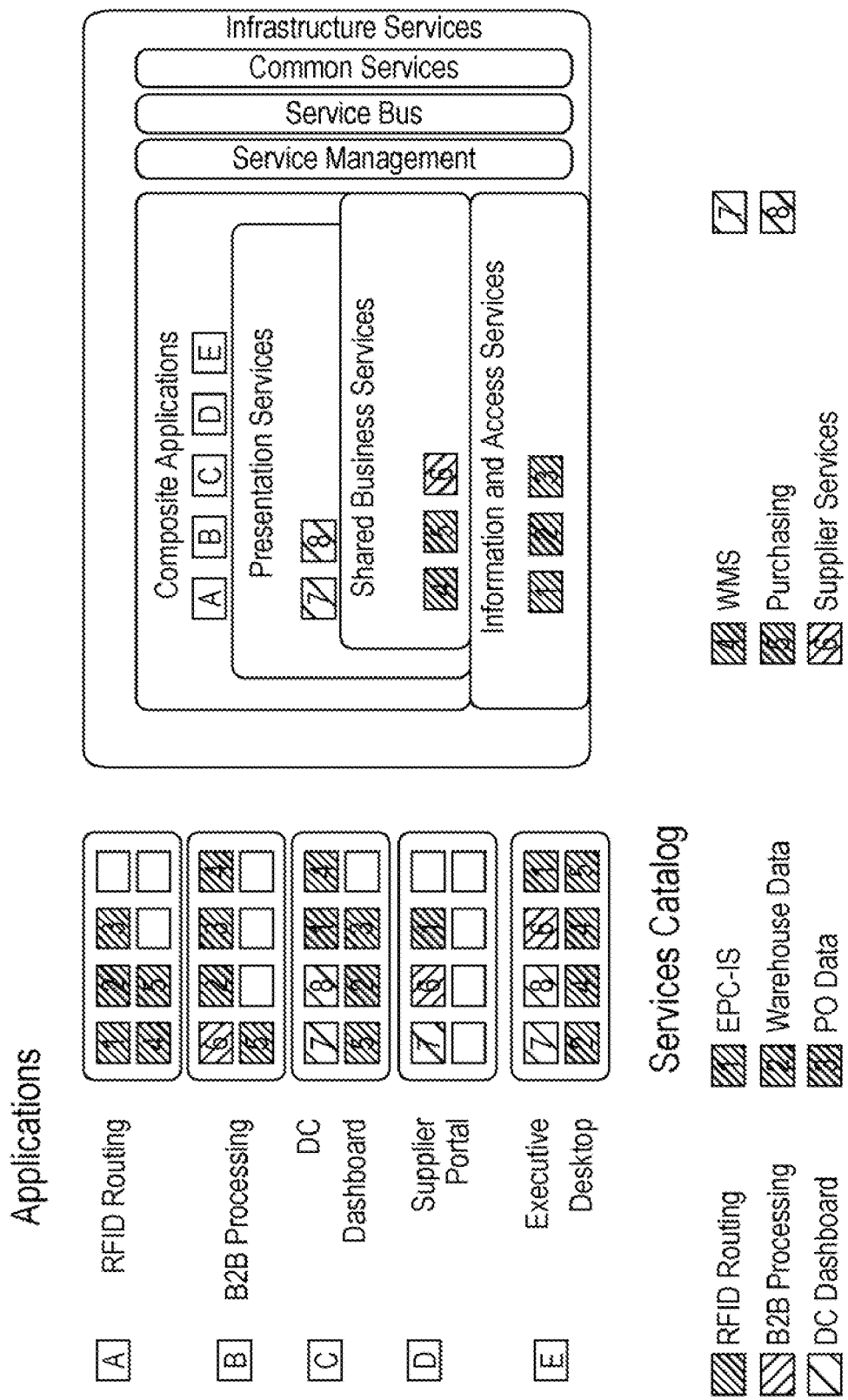
FIG. 4 is a diagram illustrating the construction of composite RFID applications from services.

FIG. 4 illustrates how applications can be built with multiple services exposed using SOA software, such as a service bus. In this example, the services can include: —presentation services 1) EPC-IS, 2) Warehouse data, and 3) Purchase order data; —shared business services—4) Warehouse management software, 5) Purchasing, and 6) supply services, and—presentation services, 7) Portal services and 8) reporting services. Applications can use some of all of these services made available through the SOA software.

Figure 5A:
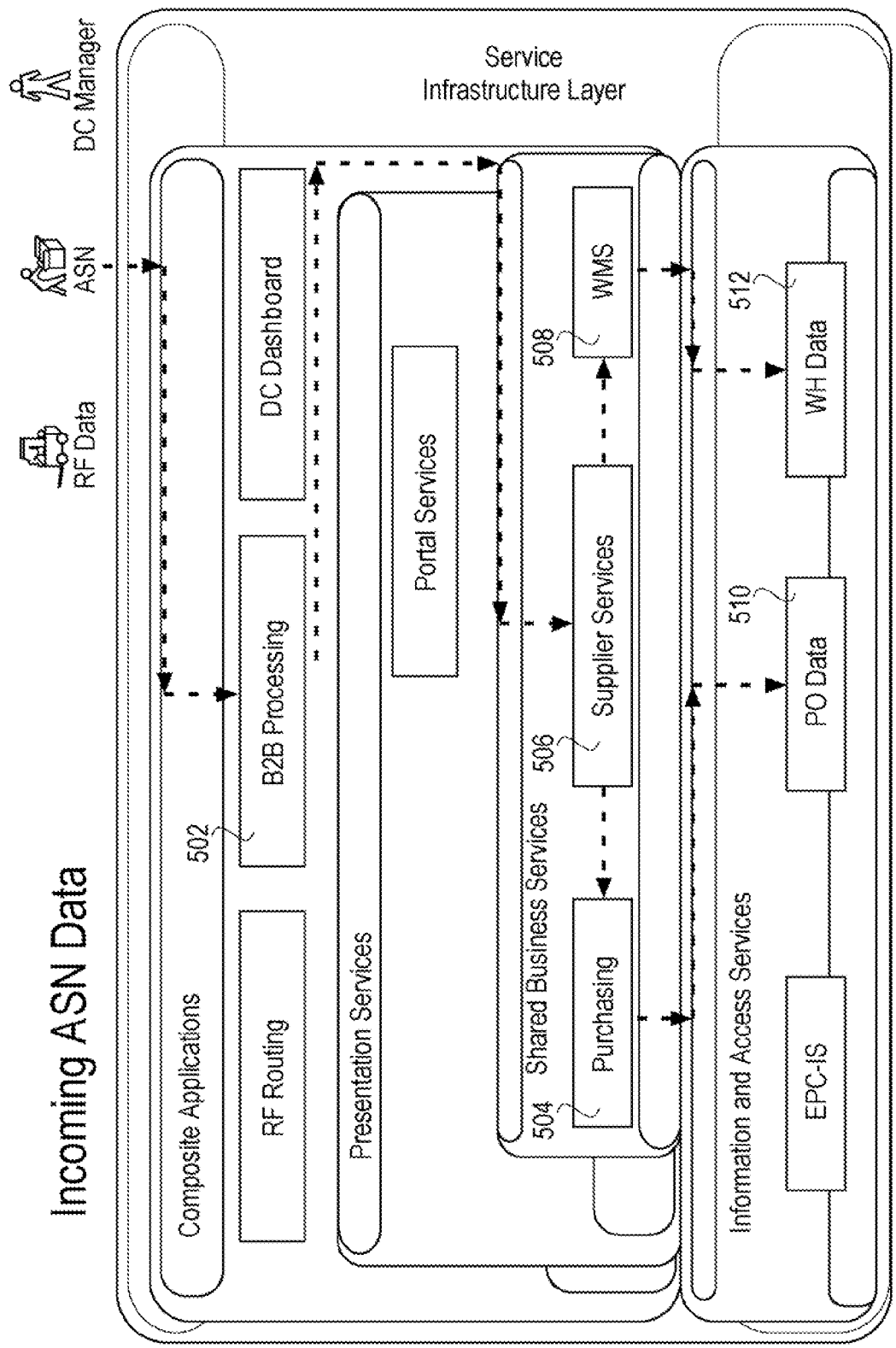
FIG. 5A-5C illustrate interactions of multiple users in an RFID system

FIG. 5A illustrates one use of the SOA-based system for RFID. A business partner can provide advance shipment notification (ASN) by accessing the system through B2B processing 502. The shared business services purchasing 504, supplier services 506 and WMS 508 update the purchase order data 510 and warehouse data 512.

Figure 5B:
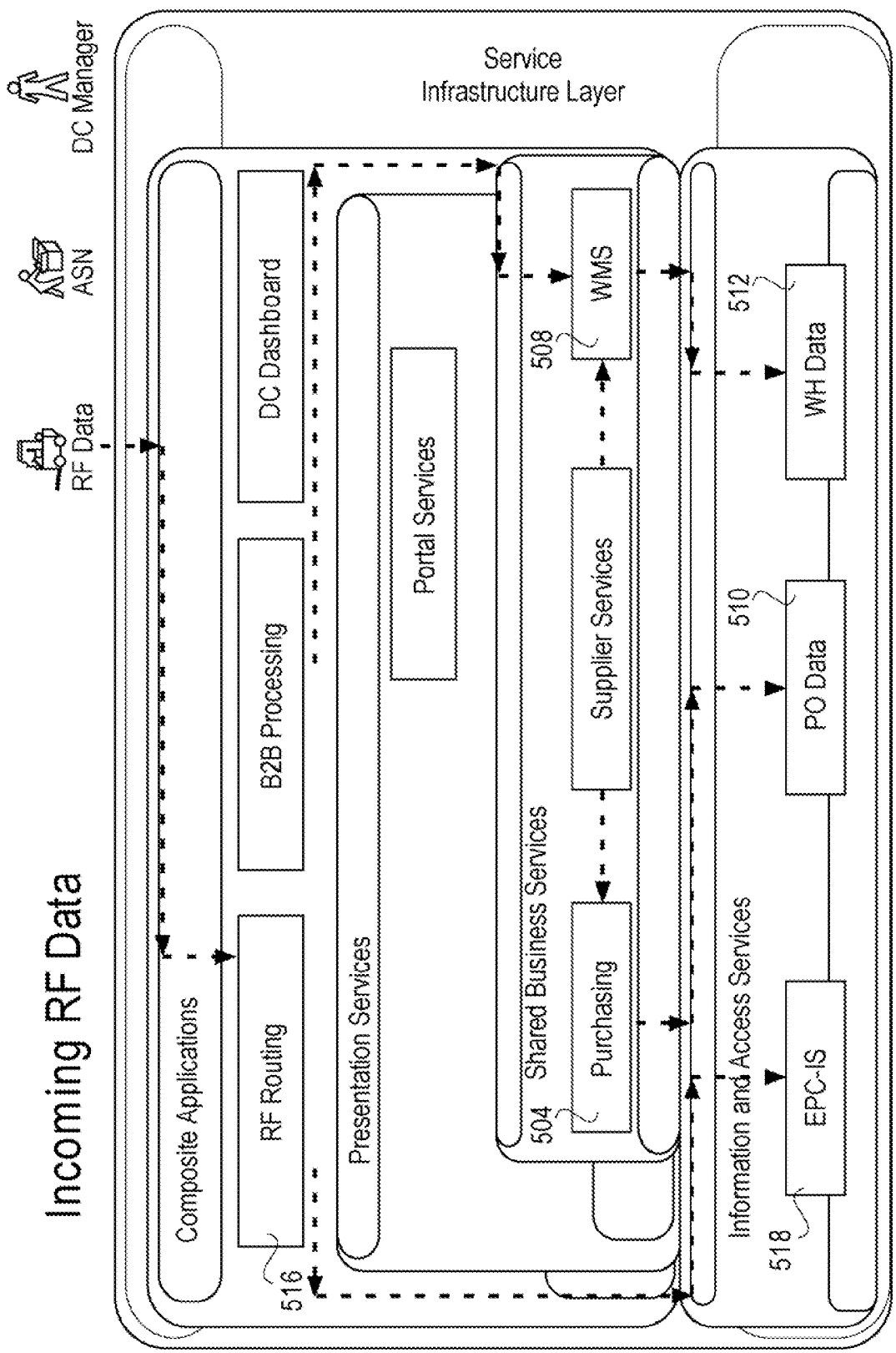

In FIG. 5B, the RFID data uses the RF routing service 514 can use the EPC-IS 518. RF routing service 514 can also use the WMS 508 to update warehouse data 512 and use the purchasing service 504 to update the purchase order data 510.

Figure 5C:
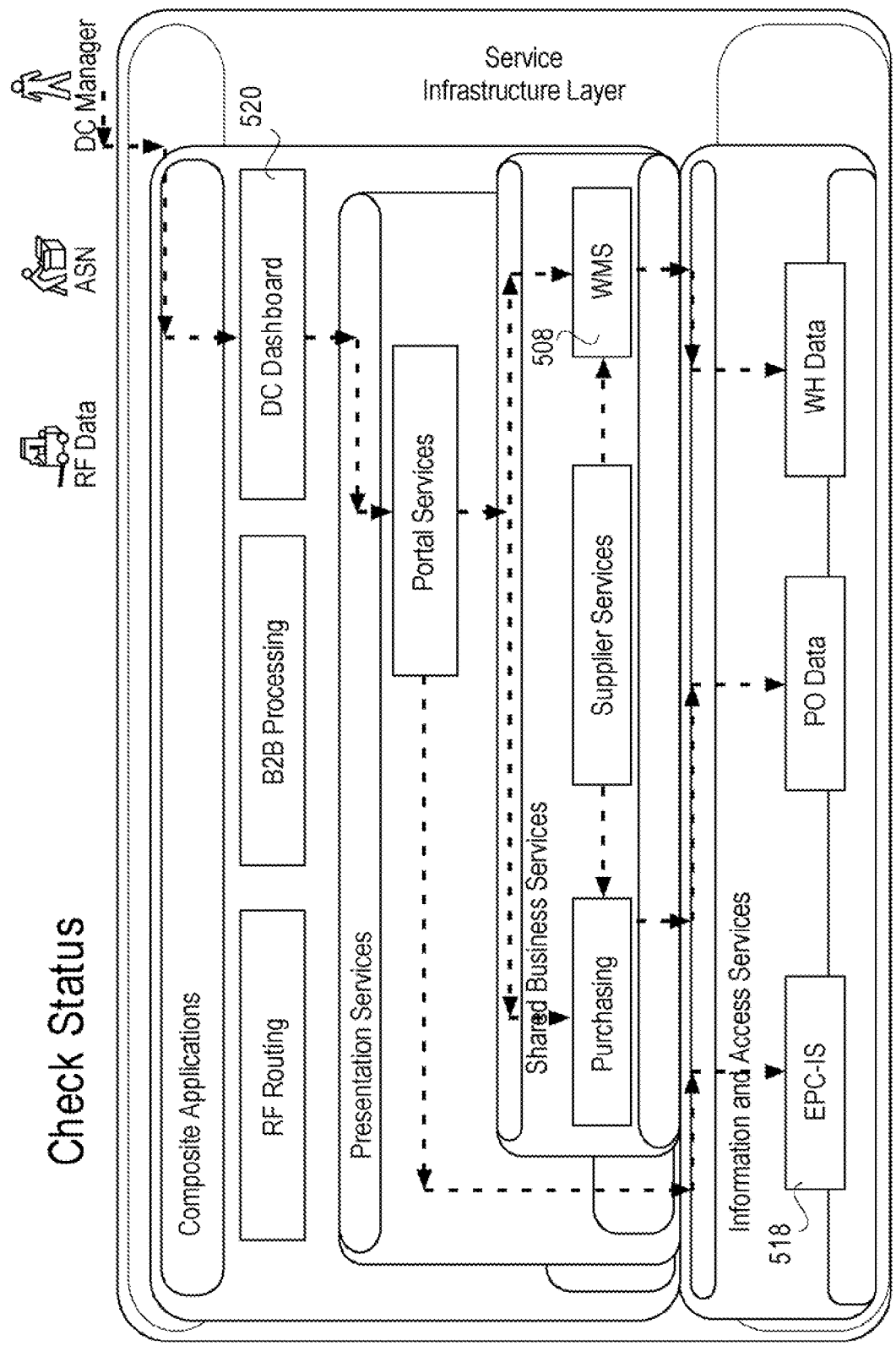

In FIG. 5C the manager can use the DC dashboard 520 to update and view information.

The system of 5A-5C can allow the dashboard user to see the difference between the supplier's purchase order info and the RFID info. Mismatches such as an overage or underage can be automatically flagged.

The RFID edge server can provide for RFID data filtering and business rules. The RFID edge server can work with a variety of RFID readers. Applications can interact with an RFID edge server through an Application-Level Events (ALE) interface. ALE can provide a way for developers to define high-level events that are needed by specific customer enterprise applications. Enterprise applications receive incoming data in formats designed for easy integration and can obtain RFID data without requiring programmers to interact directly with RFID readers or to perform any low-level real-time processing or scheduling.

Figure 6:
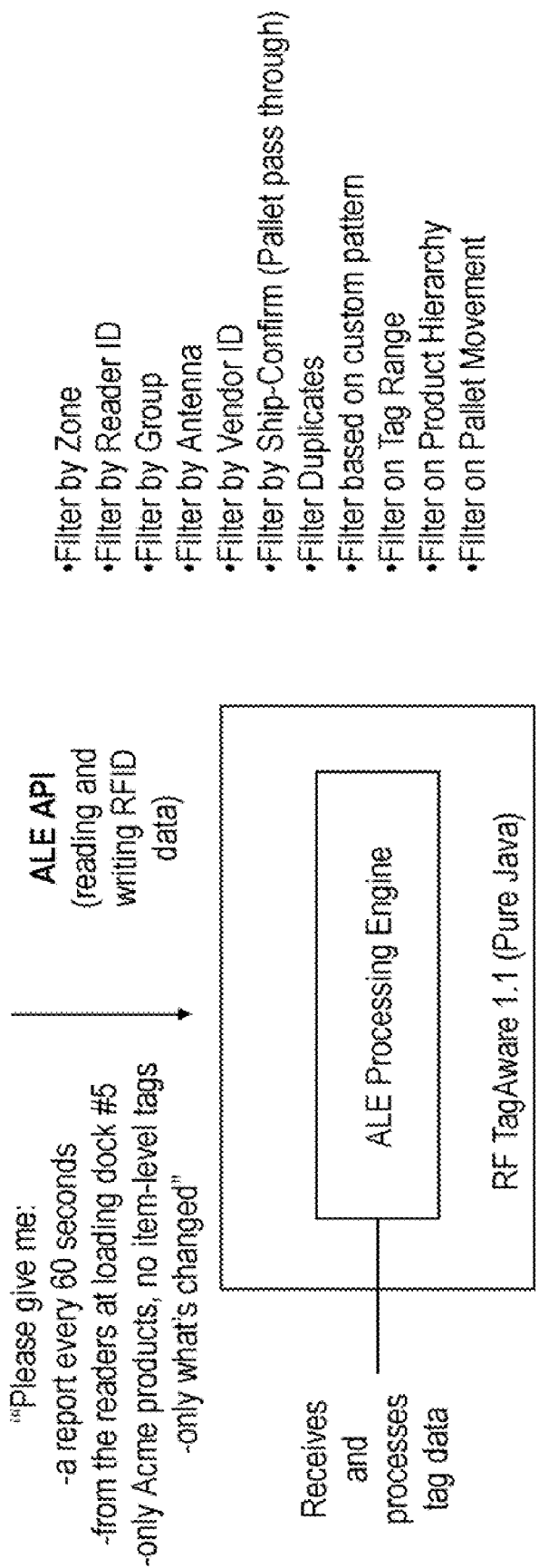
FIG. 6 illustrates an ALE processing engine that can be run at an application server at an RFID edge server.

FIG. 6 illustrates an ALE processing engine that can be run at an application server at an RFID edge server. FIG. 6 also shows common ALE filters.

Application-Level Events (ALE) defines an interface through which an application could indicate exactly what information it wants from the raw stream of RFID reads. Through ALE, an application can specify a number of things:
  Which locations it wants to read from.
  What interval of time to accumulate data.
  How to filter the data.
  How to group the results.
  Whether to report currently visible tags or just additions or deletions.
  Whether to report actual EPCs or just a count of the tags that are read.

A request of this kind may be made in an on-demand mode, where the reads are performed in response to an application request, or as a standing request, where data is sent to the application periodically without further request.

An RFID application can make a high-level request for data through the ALE interface, and the hardware or software on the other side of the ALE interface fulfills the request. ALE shields applications from low-level implementation detail.

Another benefit for end users is that ALE facilitates sharing RFID data among many applications simultaneously. Different applications may make requests through the ALE interface, without requiring those applications to have knowledge of each other. If two applications request data from the same reader, the implementation of ALE mediates those requests and makes sure that each application receives the data it needs. Using ALE each RFID can interact with a number of applications rather than be just a dedicated peripheral for a specific application.

The EPC Information Service [EPCIS] is a specification for a standard interface for accessing EPC-related information. Because an Electronic Product Code (EPC) gives each object a unique serial number, each individual object can be tracked independently and fine-grained real-time information about each individual object can be collected, stored and acted upon. EPC Information Services are a way for supply chain partners to share and exchange information efficiently, because a standard interface allows trading partners to use the same functions or methods for querying data across the supply chain, leading to reduced times integrating with partners if everyone uses the same interface, even though they may store the information in different types of underlying databases.

Information Service is a technical specification for a data communication interface. EPC Information Services are designed to support both on-demand polling access and a 'push' model supporting standing queries. Depending on how the security for each individual EPCIS implementation is configured, you might be granted the right to define your own standing queries —or you might only have the option of 'subscribing' to an existing query which was pre-defined by the owner or provider of a particular EPCIS service. EPC-related Data can include:
  1. timestamped event data collected throughout the lifecycle of an object e.g. Observations (low-level tag readings), Measurements (sensor data, e.g. temperature history), Containment History, Higher-level Location History, Associations with Business Transactions.
  2. quasi-static attributed data defined at serial-level but not continuously updated e.g. Date of Manufacture, Date of Expiry, Custom Configuration etc.

The EPC Information Service lies at the top layer of the EPC Network technology stack. EPCIS can allow business logic to be mixed with read 'events' coming from RFID readers. The layers underneath EPCIS (e.g. Filtering & Collection [ALE], Reader Protocol etc.) can be primarily concerned with simple triples of data (Reader, Tag EPC, timestamp). EPCIS allows for higher-level meanings to be stored or accessed, involving business processes and business transactions.

The EPC Information Service Specification can specify the standard interfaces for:
  Query (getting data from an EPCIS)
  Capture (putting data into an EPCIS)

The EPCIS interface can be implemented as an EPCIS server. In terms of implementing an EPC Information Service, you can choose to either host your own EPCIS interface coupled to your existing databases for serial level data or subscribe to a technology solution provider hosting a managed EPCIS service.

Trading partners may be able to find an EPCIS by using the Object Name Service (ONS), doing a lookup based on the EPC of your products. Serial-level pointers can also be stored securely within registries called Discovery Services. Discovery Service registries can be updated by each custodian on handover, with serial-level EPC lookup.

Figure 7:
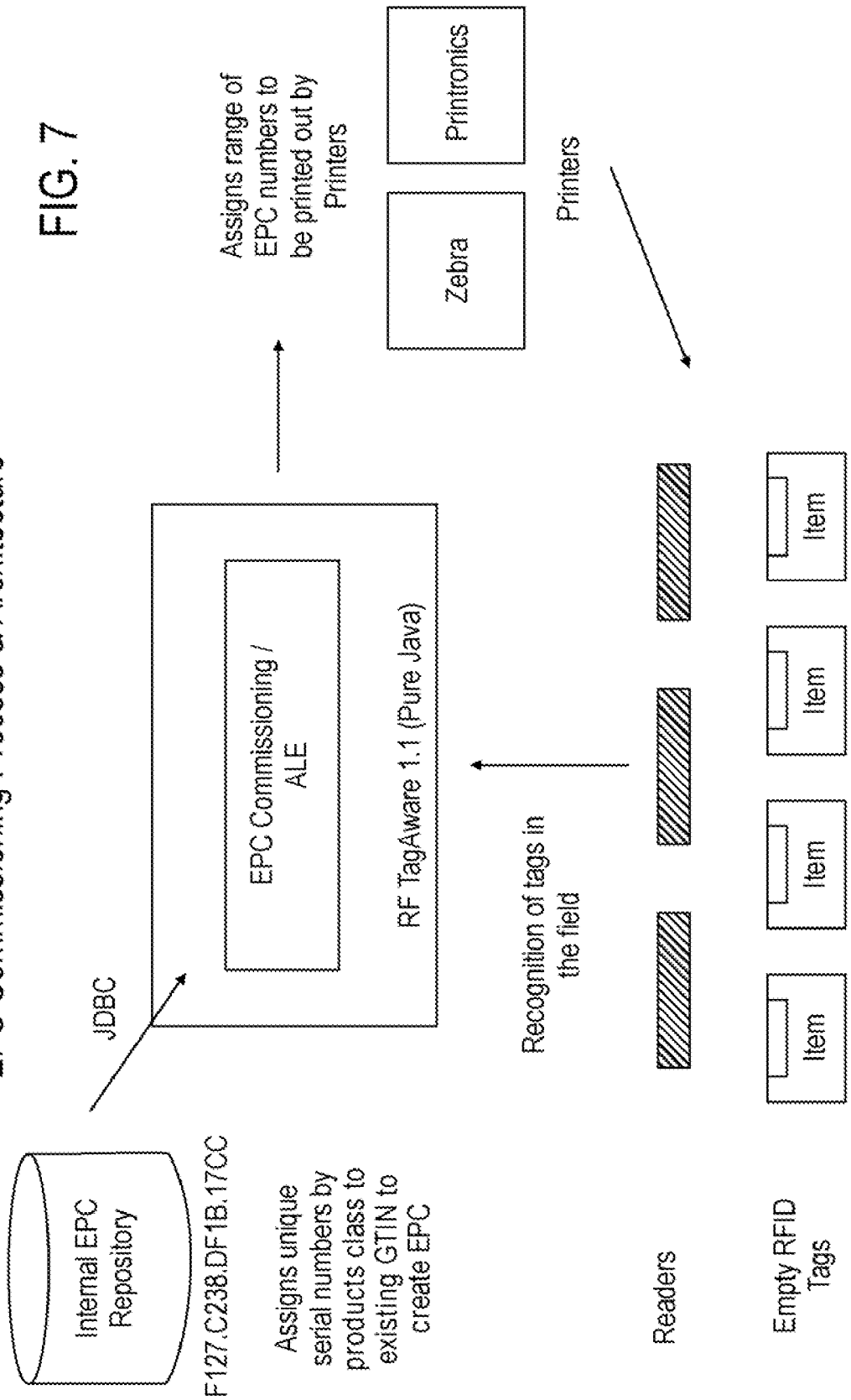
FIG. 7 is a diagram that illustrates the EPC commissioning process.

FIG. 7 shows an example of EPCIS commissioning as a J2EE application that can run on an application server at an application server at an EPCIS server. Alternately, some of the EPCIS functions can be run at an application server at an RFID edge server.

Figure 8:
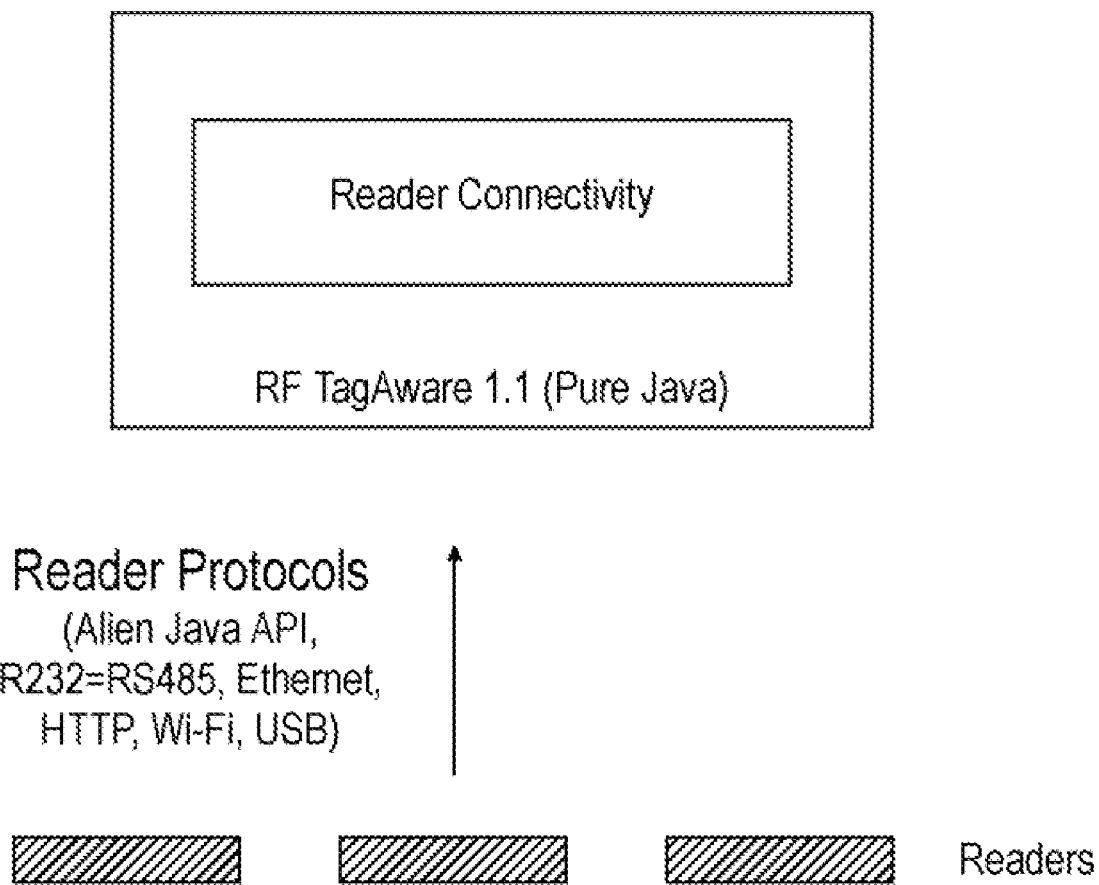
FIG. 8 is a diagram that illustrates reader connectivity.

FIG. 8 illustrates the use of reader connectivity software that can be run at an application server at an RFID edge server. A number of different reader protocols can be supported which can allow a single RFID edge server interact with multiple different types of RFID readers.

The RFID data can be enriched or compared with non-RFID data. For example, non-RFID data, such as expiration data can be stored, and used to make decisions in combination with the RFID data. For example, the product closest to its expiration date can be identified and then sent to sale first.

The service bus can allow RFID data to be stored and routed. Integration can allow systems and processes to interact. Portal systems can provide personalized display for each system user.

One embodiment may be implemented using a conventional general purpose or a specialized digital computer or microprocessor(s) programmed according to the teachings of the present disclosure, as will be apparent to those skilled in the computer art. Appropriate software coding can readily be prepared by skilled programmers based on the teachings of the present disclosure, as will be apparent to those skilled in the software art. The invention may also be implemented by the preparation of integrated circuits or by interconnecting an appropriate network of conventional component circuits, as will be readily apparent to those skilled in the art.

One embodiment includes a computer program product which is a storage medium (media) having instructions stored thereon/in which can be used to program a computer to perform any of the features presented herein. The storage medium can include, but is not limited to, any type of disk including floppy disks, optical discs, DVD, CD-ROMs, micro drive, and magneto-optical disks, ROMs, Rams, EPROM's, EPROM's, Drams, Rams, flash memory devices, magnetic or optical cards, Nano systems (including molecular memory ICs), or any type of media or device suitable for storing instructions and/or data.

Stored on any one of the computer readable medium (media), the present invention includes software for controlling both the hardware of the general purpose/specialized computer or microprocessor, and for enabling the computer or microprocessor to interact with a human user or other mechanism utilizing the results of the present invention. Such software may include, but is not limited to, device drivers, operating systems, execution environments/containers, and user applications.

The foregoing description of preferred embodiments of the present invention has been provided for the purposes of illustration and description. It is not intended to be exhaustive or to limit the invention to the precise forms disclosed. Many modifications and variations will be apparent to one of ordinary skill in the relevant arts. For example, steps performed in the embodiments of the invention disclosed can be performed in alternate orders, certain steps can be omitted, and additional steps can be added. The embodiments were chosen and described in order to best explain the principles of the invention and its practical application, thereby enabling others skilled in the art to understand the invention for various embodiments and with various modifications that are suited to the particular use contemplated. It is intended that the scope of the invention be defined by the claims and their equivalents.

What is claimed is:

1. A system having one or more processors and a set of instructions executed by the one or more processors, said system comprising:
   an radio frequency identification (RFID) edge server adapted to associate with multiple RFID readers at a location, wherein the RFID edge server filters RFID data being read by the RFID readers; and
   a service bus adapted to integrate a plurality of disparate resources by routing multiple services between the resources based on address or content, sending requests to and receiving responses from the disparate resources integrated with the service bus, and performing translation between the disparate resources, wherein the service bus receives the filtered RFID data from the RFID edge server and provides the filtered RFID data to the multiple services that consume the RFID data, wherein the multiple services are invoked by the disparate resources integrated with the service bus; and
   a service registry that publishes a set of information used to discover and invoke the multiple services, wherein the set of information is stored in a database;
   wherein two or more of the multiple services listed on the service bus and published on the service registry are combined to construct a composite application that employs the filtered RFID data along with non-RFID warehouse data; and
   an application level event (ALE) processing engine that receives a request from the composite application to access the RFID data, said request indicating the type of information to retrieve from the stream of RFID data, and wherein after receiving said request, the ALE processing engine periodically sends the information retrieved from the RFID data to the composite application without further requests from the composite application.

2. The system of claim 1, wherein the RFID edge server includes an application server.

3. The system of claim 1, wherein an RFID routing service is available through the service bus.

4. The system of claim 1, wherein a B2B processing service is available through the service bus.

5. The system of claim 1, wherein a dashboard console is available through the service bus.

6. The system of claim 1, wherein a portal uses data available through the service bus.

7. The system of claim 1, wherein EPC-IS is available through the service bus.

8. The system of claim 1, wherein Warehouse data is available through the service bus.

9. The system of claim 1, wherein purchase order data is available through the service bus.

10. The system of claim 1, wherein a Warehouse Management System is available through the service bus.

11. The system of claim 1, wherein supplier services is available through the service bus.

12. The system of claim 1, wherein the object naming service (ONS) is available through the service bus.

13. The system of claim 1, wherein product information management (PIM) is available through the service bus.

14. The system of claim 1, wherein the RFID edge server and at least some of the RFID readers are interconnected using a local network.

15. The system of claim 1, wherein the RFID edge server is adapted to filter communications from the RFID readers.

16. The system of claim 1, wherein the RFID edge server is adapted to do device management.

17. The system of claim 1, wherein the service bus has an associated enterprise security.

18. A method comprising:
   filtering radio frequency identification (RFID) data being read by multiple RFID readers at an RFID edge server adapted to associate with the multiple RFID readers, wherein the RFID edge server is executed on at least one computing device; and
   providing a service bus on said computing device, wherein the service bus is adapted to integrate a plurality of disparate resources by routing multiple services between the resources based on address or content, sending requests to and receiving responses from the disparate resources integrated with the service bus, and performing translation between the disparate resources,
   providing a service registry on said computing device, wherein the service registry publishes a set of information used to discover and invoke the multiple services, wherein the set of information is stored in a database;
   receiving, by the service bus, the filtered RFID data from the RFID edge server and providing the filtered RFID data to the multiple services that consume the RFID data, wherein the multiple services are published on the service registry and invoked by the disparate resources integrated with the service bus; and
   combining two or more of the multiple services listed on the service bus to construct a composite application that employs the filtered RFID data along with non-RFID warehouse data; and
   receiving a request from the composite application to an application level event (ALE) processing engine, said request indicating the type of information to retrieve from the stream of RFID data, wherein after receiving said request, the ALE processing engine periodically sends the information retrieved from the RFID data to the composite application without further requests from the composite application.

19. A computer readable storage medium having a set of instructions stored thereon, said instructions when executed by one or more processors, causing the one or more processors to carry out the steps of:

filtering radio frequency identification (RFID) data being read by multiple RFID readers at an RFID edge server adapted to associate with the multiple RFID readers; and providing a service bus adapted to integrate a plurality of disparate resources by routing multiple services between the resources based on address or content, sending requests to and receiving responses from the disparate resources integrated with the service bus, and performing translation between the disparate resources, providing a service registry that publishes a set of information used to discover and invoke the multiple services, wherein the set of information is stored in a database;

receiving, by the service bus, the filtered RFID data from the RFID edge server and providing the filtered RFID data to the multiple services that consume the RFID data, wherein the multiple services are published on the service registry and invoked by the disparate resources integrated with the service bus; and combining two or more of the multiple services listed on the service bus to construct a composite application that employs the filtered RFID data along with non-RFID warehouse data, and receiving a request from the composite application to an application level event (ALE) processing engine, said request indicating the type of information to retrieve from the stream of RFID data, wherein after receiving said request, the ALE processing engine periodically sends the information retrieved from the RFID data to the composite application without further requests from the composite application.

\* \* \* \* \*

UNITED STATES PATENT AND TRADEMARK OFFICE
CERTIFICATE OF CORRECTION

| | |
|---|---|
| PATENT NO. | : 7,937,297 B2 |
| APPLICATION NO. | : 11/397210 |
| DATED | : May 3, 2011 |
| INVENTOR(S) | : Boland et al. |

It is certified that error appears in the above-identified patent and that said Letters Patent is hereby corrected as shown below:

In column 1, line 14, delete "Architecture"filed" and insert -- Architecture" filed --, therefor.

In column 1, line 67, after "SOA" insert -- . --.

In column 2, line 1, after "architecture" insert -- . --.

In column 2, line 5, after "system" insert -- . --.

In column 3, line 6, delete "wokflows," and insert -- workflows; --, therefor.

In column 3, line 61, delete "resourses" and insert -- resources --, therefor.

In column 4, line 49, delete "on" and insert -- one --, therefor.

In column 5, line 31, after "issues" insert -- . --.

In column 5, line 37, after "alerts" insert -- . --.

In column 6, line 28, delete "RFID. systems" and insert -- RFID Systems. --, therefor.

In column 12, line 10, In Claim 19, delete "data," and insert -- data; --, therefor.

Signed and Sealed this
Eighteenth Day of October, 2011

David J. Kappos
*Director of the United States Patent and Trademark Office*